United States Patent
Teramoto et al.

[11] Patent Number: 4,925,913
[45] Date of Patent: May 15, 1990

[54] HEAT-RESISTANT UNSATURATED POLYESTER

[75] Inventors: Takero Teramoto; Kazuhiro Watanabe, both of Kawasaki, Japan

[73] Assignees: Nippon Steel Corporation; Nippon Steel Chemical Co., Ltd., both of Tokyo, Japan

[21] Appl. No.: 404,965

[22] Filed: Sep. 8, 1989

[51] Int. Cl.⁵ .............................................. C08G 63/18
[52] U.S. Cl. ................................... 528/272; 528/274;
528/296; 528/298; 528/304; 528/306; 528/308;
528/308.6; 525/132; 525/165; 525/437;
525/451; 522/1; 522/6
[58] Field of Search ............... 528/272, 274, 296, 298,
528/304, 306, 308, 308.6, 97, 98, 102; 525/132,
165, 437, 451; 522/6, 1

[56] References Cited
U.S. PATENT DOCUMENTS
3,546,165 12/1970 Morgan .............................. 528/190

FOREIGN PATENT DOCUMENTS
52-117392 10/1977 Japan .
57-42710 3/1982 Japan .
57-192432 11/1982 Japan .
59-171948 9/1984 Japan .
64-1723 1/1989 Japan .

Primary Examiner—John Kight, III
Assistant Examiner—S. A. Acquah
Attorney, Agent, or Firm—Wenderoth, Lind & Ponack

[57] ABSTRACT

A heat-resistant unsaturated polyester having a structure represented by the formula (I)

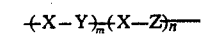

(I)

wherein X represents a structure (A):

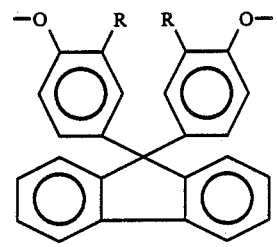

wherein
R represents hydrogen or an alkyl group having 1 or 2 carbon atoms;
Y represents a structure (B): —OC—CH=CH—CO—
Z represents a structure:

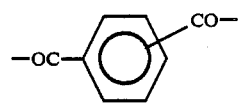

and
m and n independently represent a repeating numbers;
a mole ratio of Y/Z is 10/90 to 99/1; and
the polyester has an inherent viscosity ($\eta$ inh) of at least 0.4 dl/g as determined at a temperature of 30° C. in a solution of 0.5 g of the polyester in 100 ml of dimethylformamide.

3 Claims, No Drawings

HEAT-RESISTANT UNSATURATED POLYESTER

BACKGROUND OF THE INVENTION

1. Field of the Invention

The present invention relates to novel heat-resistant unsaturated polyesters, to thermosetting resins capable of providing heat-resistant materials by a thermal or photochemical curing, and to photosensitive materials.

2. Description of the Related Art

Various polyesters derived from a 9,9-bis(4-hydroxyphenyl) fluorene starting material have been proposed. For example, Japanese Unexamined Patent Publication (Kokai) No. 57-192432 discloses polyesters obtained by a reaction with mixtures (3/7 - 7/3) of terephthalic acid/isophthalic acid to provide the polyesters with a solubility in an organic solvent and thus improve the moldability of the polyesters. U.S. Pat. No. 3546165 also discloses single polyesters of 9,9-bis(4-hydroxyphenyl)-fluorene with isophthalic acid or a fatty acid, and Japanese Unexamined Patent Publication (Kokai) No. 64-1723, published on Jan. 6, 1989, discloses that polyesters obtained by reacting aromatic carboxylic acids with mixtures (1/99 to 60/40) of terephthalic acid/adipic acid have an excellent moldability, due to the remarkable differences between the glass transition temperatures and the decomposition temperatures thereof.

There is a rising demand for heat-resistant photosensitive materials, which are currently utilized as protective materials, insulation materials, solder resists, adhesives, coating materials or the like in the electric and electronic fields, and as heat-resistant photoresists in the production of semi-conductor elements.

The above-mentioned types of photosensitive materials must have an excellent photocurability (or photosettability) and an excellent heat-resistance after photocuring, as inherent characteristics. Furthermore, the photosensitive materials should exhibit a good adhesion to substrates and have satisfactory characteristics such as insulation properties, water-vapor resistance, chemical resistance, surface hardness, and transparency. Also, the polyesters should be soluble in organic solvents and have film-formability properties, and further, the photosensitive materials in the form of such solutions should have an excellent storage stability. Namely, problems such as gellation over an elapse of time prior to the use thereof should not arise.

Nevertheless, conventional photosensitive materials in which the polymers themselves satisfy all of the above-mentioned characteristic requirements, without the use of sensitizing agents, (see, Japanese Unexamined Patent Publication (Kokai) Nos. 52-117392, 57-42710 and 59-171948) are not currently available. Furthermore, photosensitive materials having an excellent photocurability usually have a poor storage stability and adhesion to substrates.

When conventional soluble heat-resistance polyesters are formed into molded articles such as films, the resultant molded articles have a disadvantageously poor chemical resistance. This chemical resistance is an important characteristic from the viewpoint of the environment of the application of plastic films, and the processing steps. Plastics generally have a strong resistance to acids or alkalis, but a weak resistance to organic solvents.

SUMMARY OF THE INVENTION

Accordingly, the objects of the present invention are to eliminate the above-mentioned problems of the prior art and to provide novel polyesters which, while maintaining, prior to the thermal treatment, a good solubility, moldability, and the other characteristics as in conventional polyesters, are insoluble in all organic solvents and chemically stable after a thermal treatment and photocuring.

Another object of the present invention is to provide a novel and useful heat-resistant photosensitive material having an excellent storage stability, and even without the use of a sensitizing agent, having a good photocurability or inherent heat-resistance, an excellent adhesion to substrates, and the above-mentioned other characteristic requirements.

Other objects and advantages of the present invention will be apparent from the following description.

In accordance with the present invention, there is provided a heat-resistant unsaturated polyester having a structure represented by the formula (I):

wherein X represents a structure (A):

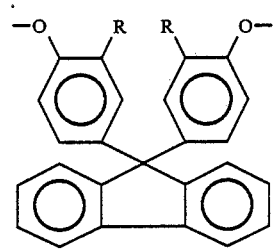

wherein
R represents hydrogen or an alkyl group having 1 or 2 carbon atoms;
Y represents the structure (B):

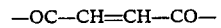

Z represents the structure:

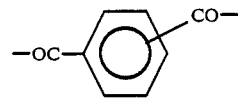

and
m and n independently represent a repeating number; wherein a mole ratio of Y/Z is 10/90 to 99/1; and the polyester has an inherent viscosity ($\eta_{inh}$) of at least 0.4 dl/g as determined at a temperature of 30° C. in a solution of 0.5 g of the polyester in 100 ml of dimethylformamide.

DESCRIPTION OF THE PREFERRED EMBODIMENTS

The polyesters according to the present invention contains a diol component (i.e., X component) and an acid mixture component comprising a terephthalic acid component (i.e., Z component) and a fumaric acid or maleic acid component (i.e, Y component, sometimes referred to as "fumaric acid component").

The diol component (X component) contained in the present polyesters is represented by the formula:

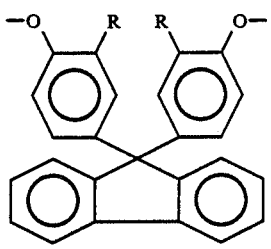

wherein R is hydrogen or a lower alkyl group such as a methyl group or ethyl group. The diol component is derived from the starting diols (or their derivatives) Examples of such diols are 9,9-bis)4-hydroxyphenyl) fluorene, 9,9-bis(3-methyl-4-hydroxyphenyl) fluorene, and 9,9-bis(3-ethyl-4-hydroxyphenyl) fluorene.

Among the acid mixture components, the terephthalic acid component (Z component) is derived from the starting terephthalic acid (or its derivatives). A typical example of such derivatives is terephthalic acid chloride. The terephthalic component may be partly substituted by isophthalic acid, and in this case, the amount of isophthalic acid used is 50 mole% or less, preferably 20 mole% or less, of the terephthalic acid component, from the viewpoint of the heat-resistance of the polyester.

The fumaric acid component (Y component) is derived from the starting fumaric acid or maleic acid (or their derivatives). Typical examples of such derivatives are chloromaleic acid, itaconic acid, and citraconic acid. Of these compounds, the use of fumaric acid or its derivatives is preferable because these components are readily available at a low cost and do not impair the heat-resistance, and because the resultant polyesters are soluble in a low boiling point solvent such as chloroform or tetrahydrofuran. The fumaric or maleic component (Y component) may be partially substituted by other unsaturated fatty acid dicarboxylic acids such as itaconic acid, as long as the desired properties of the polyesters are not adversely affected.

Regarding the mole ratio of the fumaric component (Y component) and the terephthalic component (Z component), the present invention is characterized by the improvement in the chemical resistance of the polymer due to the insolubilization thereof in organic solvent by the thermal curing. This phenomenon advantageously occurs when the mole ratio of Y component/Z component is 10/90 to 99/1, preferably 30/70 to 90/10. According to the present invention, the desired heat-resistant polyester can be obtained by skillfully utilizing the difference in the solubility of the polymer in organic solvent before and after the molding (or processing) of the polymer. When the mole ratio of the fumaric component is less than 10%, the chemical resistance is not sufficiently improved after the thermal treatment.

Since the polyester according to the present invention has an unsaturated bond, the curing thereof by, for example, a thermal treatment, can be effected. The thermal treatment can be carried out at a temperature of 250 to 300° C. for 25 to 30 minutes. When the mole ratio of the fumaric or maleic acid in the acid component (Y component) is less than 10%, a substantially complete chemical resistance cannot be obtained even by the thermal treatment.

The polyester according to the present invention has a high degree of polymerization, i.e., an inherent viscosity ($\eta_{inh}$), as determined at a temperature of 30° C. in a solution of 0.5 g of the polyester in 100 ml of dimethylformamide, of at least 0.4 dl/g, preferably 0.8 to 2.5 dl/g. When the inherent viscosity is more than 2.5 dl/g, the viscosity of the polymer solution tends to become very high and, therefore, the workability or processability is sometimes decreased.

The polyester according to the present invention can be advantageously utilized as a heat-resistant photosensitive material by linearly esterifying, as a main component, a dibasic acid having a photopolymerizable carbon-carbon double bond in the molecule thereof and a diol. The resultant polyester has a photopolymerizable carbon-carbon double bond at a certain content in the linear molecule thereof.

The above-mentioned unsaturated polyester has an excellent solubility in organic solvents such as 1,1,2,2-tetrachloroethane, N-methylpyrrolidone, and dimethylformamide and an excellent film formability as well as an excellent storage stability, i.e., no gellation occurs when the polyester is stored in the form of a solution. When the polyester is used as the heat-resistant photosensitive material, the polyester having the above-mentioned structure is dissolved in the above-mentioned solvent to form a dilute solution. The concentration of the solution may be varied depending upon the purpose of the application. For example, when a film thickness of 2 to 3 $\mu m$ is desired, a suitable concentration of the solution is approximately 5% by weight. The heat-resistant photosensitive according to the present invention is photocured due to the presence of the photopolymerizable carbon-carbon double bond in the linear molecule and the cured film exhibits an excellent heat resistance due to the crosslinking of the linear molecules. Furthermore, the adhesion of the cured film to the substrate is good and, therefore, the etching treatment of the surface of the substrate, which is conventionally essential for improving the adhesion strength, can be advantageously omitted. In addition, the film obtained from the photocuring according to the present invention has excellent characteristics such as insulation properties, water-vapor resistance, chemical resistance, surface hardness and transparency, and satisfies all of the above-mentioned other characteristics required from a heat-resistant photosensitive material.

The Y component to be esterified with a diol usable in the formation of the photosensitive material is a dibasic acid having a photopolymerizable carbon-carbon double bond in the molecule thereof. Typical examples of such dibasic acids are fumaric acid, maleic acid, itaconic acid, and citraconic acid. The Z component used in the present invention is an aromatic acid component added to maintain the heat-resistance. Preferable examples of such aromatic acids are phthalic acid, isophthalic acid, and terephthalic acid.

To obtain the desired photocurability of the heat-resistant photosensitive materials, the mole ratio of Y component/Z component should be 20/80 to 99/1, preferably 30/70 to 90/10. When the mole content of the Y component containing a carbon-carbon double bond is less than 20 mole% of the components Y and Z, the photocurability of the unsaturated polyester is greatly impaired. The photosensitivity is improved and the water-vapor resistance and the chemical resistance can be maintained, by an increase in the amount of the Y component.

The unsaturated polyesters usable in the heat-resistant photosensitive materials according to the present invention should have an inherent viscosity ($\eta_{inh}$) of at least 0.4 dl/g, preferably 0.4 to 2.5 dl/g, more preferably 0.7 to 2.5 dl/g, as determined at a temperature of 30° C. in a solution of 0.5 g of the polyester in 100 ml of dimethylformamide. When the inherent viscosity of the unsaturated polyester according to the present invention is too low, the formation of a uniform film becomes difficult and unevenness is likely to appear in the film, and furthermore, the surface hardness according to the pencil hardness test is greatly reduced from 4H to 2H.

As mentioned above, according to the present invention the desired photosensitive materials having an excellent heat-resistance can be provided only when the mole ratio of the Y component/Z component is 20/80 to 99/1.

An example of the process for preparing the unsaturated polyester according to the present invention will now be explained.

An aqueous alkaline solution of the starting diols is prepared by adding an alkali. Although there are no specific limitations to the type of alkali usable in the present invention, preferably sodium hydroxide is used. The diols are added to the aqueous alkaline solution, to be dissolved therein upon heating. The suitable amount of the alkali is 1.2 to 2.0 times equivalent of the diols.

As the acid component, the chloride of each carboxylic acid is preferably used. The acid chloride is dissolved in, for example, 1,2-dichloroethane, chloroform, 1,1,2,2-tetrachloroethane to prepare an organic solvent solution of the acid component.

Then, the above-prepared organic solvent solution of the acid component is dropwise added to the aqueous alkaline solution while vigorously stirring, and an interfacial polycondensation occurs at the interface. The addition of an appropriate amount of an interphase transfer catalyst to the aqueous solution will accelerate the reaction. Typical examples of such a catalyst are tetraethyl ammonium chloride and triethylbenzyl ammonium chloride. The addition amount of the catalyst is the same as the amount conventionally used to obtain an interfacial polycondensation, and is usually added to the aqueous solution at a concentration of 2% or less. The use of too large an amount of the catalyst is not preferable, as the polymerization system will be emulsified and the degree of the polymerization will not be increased.

The reaction temperature is generally 10° C. to 50° C., preferably 20° C. to 30° C., and a reaction time of approximately 15 to 20 minutes is sufficient.

After completing the reaction, the resultant aqueous phase and organic phase are separated and the organic phase is washed with a small amount of water. After washing, the viscosity of the organic phase is lowered by the addition of chloroform to the organic phase, and the resultant organic phase is poured into methanol or acetone. The precipitates are recovered by filtration followed by drying, whereby the polyesters according to the present invention are obtained.

The resultant polyesters can be utilized as a starting material in the fields of, for example, coating compositions, films, and molded articles. Furthermore, when the resultant unsaturated polyester is cured by a heat treatment, a chemically stable polyester can be obtained.

The heat-resistant photosensitive materials according to the present invention are unsaturated polyesters having a photocurability as mentioned above. Although the unsaturated polyester according to the present invention has good photosensitivity, any photosensitizer can be optionally added to the above-mentioned polyester to further improve the photocuring (or photosetting) rate, if desired.

As the photosensitizer, carbonyl compounds such as benzoin, benzoin methyl ether, benzoin propyl ether, and benzyl dimethyl ketal; organic sulfur compounds such as benzyl sulfide; and halogen compounds can be used. These photosensitizers are preferably used in an amount of 0.5 mole% or less, based upon the amount of the unsaturated polyester. The use of too large an amount of the photosensitizer inevitably has an adverse affect on, for example, the storage stability.

The heat-resistant photosensitive materials according to the present invention have an excellent storage stability, i.e., when the present photosensitive materials are allowed to stand at room temperature in the form of a solution (e.g., in 1,1,2,2-tetrachloroethane, N-methylpyrrolidone), gellation does not occur over a short period of time, but when the solution is stored for a long period of time, in view of the photosensitive characteristics thereof, the solution should be stored in a dark room or a cold room.

As explained above and as illustrated below, the polyesters according to the present invention are heat-resistant and soluble in an organic solvent and become insoluble when subjected to an appropriate heat treatment. Therefore, the present polyesters are characterized by an excellent workability before processing, and after processing, the chemical resistance, formerly a drawback of polyesters, can be improved.

Since the glass transition temperature of the present polyester is 300° C. or more and the dielectric constant is 2.6, which is comparable to that of poly(tetrafluoroethylene), the present polyesters are suitable for use in heat-resistant application fields such as electrical insulation, coating compositions (or paints), and adhesives.

Furthermore, as mentioned above and as illustrated below, the heat-resistant photosensitive materials according to the present invention have an excellent photocurability, excellent heat resistance after photocuring, good adhesion to a substrate, and satisfactory characteristics such as insulation properties, heat-resistance, chemical resistance, and surface hardness. Accordingly, the present photosensitive materials are extremely useful as heat-resistant photoresist materials in, for example, protective materials, insulating materials and adhesives, in the electronics field.

Furthermore, the polyesters according to the present invention have an excellent chemical-resistance, in addition to an excellent heat-resistance, solubility, and processability. Also, since the present polyesters are not colored, they are very suitable for use in coating compositions, coating agents, and films.

EXAMPLES

The present invention now will be further illustrated by, but is by no means limited to, the following Examples and Comparative Examples.

Example 1

(Fumaric acid/Terephthalic acid = 10/90 by mole)

In 300 ml of 1,2-dichloroethane, 18.27 g of terephthalic chloride and 1.52 g of fumaric chloride were dissolved.

Also, 100 ml of 4 N aqueous sodium hydroxide was added to 1000 ml of water and 35 g of 9,9-bis(4-hydroxyphenyl) fluorene and 15 g of triethylbenzyl ammonium chloride were dissolved therein. To the resultant solution, the above prepared organic solvent solution of the acid component was added at once, while vigorously stirring, followed by allowing a reaction for 15 to 20 minutes. After the reaction, the aqueous phase was removed and the organic phase was washed twice with 500 ml of water. After the washing, 200 ml of 1,2-dichloroethane was added to the organic phase to lower the viscosity. The resultant organic phase was poured into acetone, and the resultant precipitate was recovered by filtration followed by drying. Thus, the desired polyester was obtained.

The polyester thus obtained had an inherent viscosity of 0.9 dl/g and a glass transition temperature of 335° C.

A 10% 1,1,2,2-tetrachloroethane solution of the above prepared polyester was casted on a glass plate, followed by drying under a reduced pressure at 100° C., to obtain a polyester film. The resultant film had a tensile strength of 9.0 kg/mm² and a tensile modulus of 320 kg/mm².

The film was then heat treated in an inert oven at 250° C. for 30 minutes. Thereafter, the heat-treated film was dipped in an organic solvent for several days, but no visually observed changed occurred and there were no substantial changes in the mechanical properties.

Example 2

(Fumaric acid/Terephthalic acid =20/80 by mole)

In 300 ml of 1,2 dichloroethane, 16.24 g of terephthalic chloride and 3.04 g of fumaric chloride were dissolved.

To the aqueous solution of 9,9-bis(4-hydroxyphenyl) fluorene of Example 1, the above-prepared organic solvent solution of the acid component was added at once, while vigorously stirring, and then allowed to react.

The resultant reaction mixture was treated in the same manner as in Example 1 to obtain the desired polyester product.

The polyester thus obtained had an inherent viscosity of 1.0 dl/g and a glass transition temperature of 360° C. The tensile strength of the polyester film was 8.7 kg/mm² and the tensile modulus was 310 kg/mm².

The other properties thereof were as follows:
Volume resistivity (23° C.): $1.6 \times 10^{14}$ Ω·cm
Dielectric constant: 2.61
Dielectrid dissipation factor: 0.012 (23° C., 1 MHz)
Dielectric breakdown strength: 69 kV/mm
Total light transmission: 90.3%
Yellowness: 3.05%

The film was then heat treated in an inert oven at 250° C. for 30 minutes. Thereafter, the heat-treated film was dipped in an organic solvent for several days, but no visual observed changes occurred and there were no substantial changes in the mechanical properties.

Example 3

In 300 mg of 1,2-dichloroethane, 100 mmol of a mixture of terephthalic chloride/fumaric chloride (acid mole ratio =50/50, 20/80, or 1/99) was dissolved. To the aqueous 9,9-bis(4-hydroxyphenyl) fluorene solution of Example 1, the above-prepared acid component solution was added at once, while vigorously stirring, the procedure of Example 1 was then repeated.

The properties of the resultant polyesters were respectively as follows:
Inherent viscosity: 0.9, 1.1, or 0.8 dl/g
Glass transition temperature: 330° C., 320° C., or 315° C.

The film heat-treated at 250° C. was insoluble in all organic solvents.

Comparative Example 1 (Fumaric acid/Terephthalic acid =5/95 by mole)

In 300 ml of 1,2-dichloroethane, 19.28 g of terephthalic chloride and 760 mg of fumaric chloride were dissolved.

To the aqueous solution of 9,9-bis(4-hydroxyphenyl) fluorene of Example 1, the above-prepared organic solvent solution of the acid component was added at once, while vigorously stirring, and then allowed to react.

The resultant reaction mixture was treated in the same manner as in Example 1 to obtain the desired polyester product.

The polyester thus obtained had an inherent viscosity of 1.0 dl/g and a glass transition temperature of 325° C. The tensile strength of the polyester film was 8.8 kg/mm² and the tensile modulus was 315 kg/mm².

The polyester film was then heat-treated, in the same manner as in Example 1, at 250° C. for 30 minutes. The heat-treated film was dissolved in m-cresol, N-methylpyrrolidone, dimethylformamide, dimethylacetamide, dimethylsulfoxide, chloroform and tetrachloroethane. Furthermore, the heat-treated film was dissolved in dioxane and tetrahydrofuran over a period of time.

The results of Examples 1 to 3 and Comparative Example 1 are shown in Table 1.

TABLE 1

| Terephthalic acid/Fumaric acid | Example 1 | | Example 2 | | Example 3 | | | | | | Comparative Example 1 | |
|---|---|---|---|---|---|---|---|---|---|---|---|---|
| (mole ratio) | 90/10 | | 80/20 | | 50/50 | | 20/80 | | 1/99 | | 95/5 | |
| Heat-treatment*[1] | before | after | before | after | before | after | before | after | before | after | before | after |
| m-Cresol | ◎ | x | ◎ | x | ◎ | x | ◎ | x | ◎ | x | ◎ | ◎ |
| N-Methylpyrrolidone | ◎ | x | ◎ | x | ◎ | x | ◎ | x | ◎ | x | ◎ | ◎ |
| Dimethyl formamide | ◎ | x | ◎ | x | ◎ | x | ◎ | x | ◎ | x | ◎ | ◎ |
| Dimethylacetamide | ◎ | x | ◎ | x | ◎ | x | ◎ | x | ◎ | x | ◎ | ◎ |
| Dimethylsulfoxide | ◎ | x | ◎ | x | ◎ | x | ◎ | x | ◎ | x | ◎ | ◎ |
| Chloroform | ◎ | x | ◎ | x | ◎ | x | ◎ | x | ◎ | x | ◎ | ◎ |
| Dioxane | ◎ | x | ◎ | x | ◎ | x | ◎ | x | ◎ | x | ◎ | ○ |
| Tetrahydrofuran | ◎ | x | ◎ | x | ◎ | x | ◎ | x | ◎ | x | ◎ | ○ |
| Tetrachloroethane | ◎ | x | ◎ | x | ◎ | x | ◎ | x | ◎ | x | ◎ | ◎ |
| η inh (dl/g)*[2] | 0.9 | | 1.0 | | 0.9 | | 1.0 | | 0.8 | | 1.0 | |

TABLE 1-continued

| Terephthalic acid/Fumaric acid | Example 1 | | Example 2 | | Example 3 | | | | | | Comparative Example 1 | |
|---|---|---|---|---|---|---|---|---|---|---|---|---|
| (mole ratio) | 90/10 | | 80/20 | | 50/50 | | 20/80 | | 1/99 | | 95/5 | |
| Heat-treatment*[1] | before | after | before | after | before | after | before | after | before | after | before | after |
| Tg (°C.) | | 335 | | 360 | | 330 | | 320 | | 315 | | 325 |

⊙: Easily soluble
○ : Slightly soluble (dissolved over a period of times)
x: non-soluble
*[1]250° c. × 30 minutes in an inert oven
*[2]Inherent viscosity before heat-treatment

Example 4

(Fumaric acid/Terephthalic acid - 20/80 by mole)

In 300 ml of 1,2-dichloroethane, 16.24 of terephthalic chloride and 3.04 g of fumaric chloride were dissolved. Further, 100 ml of 4 N aqueous sodium hydroxide was added to 1000 ml of water and 35 g of 9,9-bis(4-hydroxyphenyl) fluorene and, as a interphase transition catalyst, 15 g of triethylbenzyl ammonium chloride were dissolved therein. To the resultant solution, the above-prepared organic solvent solution of the acid component was added at once, while vigorously stirring, and then allowed to react for 15 to 20 minutes. After the reaction, the aqueous phase was removed and the organic phase was washed twice with 500 ml of water, and after the washing, 200 ml of 1,2-dichloroethane was added to the organic phase to lower the viscosity. The organic phase was then poured into acetone and the resultant precipitate was recovered by filtration followed by drying, whereby the desired polyester was obtained.

The polyester thus obtained had an inherent viscosity of 1.0 dl/g and a glass transition temperature of 360° C.

A 3 wt% 1,1,2,2-tetrachloroethane solution of the above-prepared polyester was prepared as a sample A.

Example 5

In 300 ml of 1,2-dichloroethane, 100 mmol of a mixture of fumaric chloride/terephthalic chloride (a mole ratio =50/50, 80/20, 99/1) was dissolved and the resultant solution was added to the aqueous 9,9-bis(4-hydroxyphenyl) fluorene solution of Example 1, while vigorously stirring. The synthesis of the desired polyester was carried out in the same manner as in Example 1.

The properties of the resultant polyesters were as follows.
Inherent viscosity: 0.9, 1.1, or 1.0 dl/g
Glass transition temperature: 330° C., 320° C., or 310° C.

The polyesters were dissolved in 1,1,2,2-tetrachloroethane at a concentration of 3% by weight. These solutions were labelled samples B, C, and D, respectively.

Example 6

In 300 ml of 1,2-dichloroethane, 100 mmol of a mixture of maleic chloride/terephthalic chloride (20/80 by acid mole ratio) was dissolved. The resultant solution was added to the aqueous solution of 9,9-bis(4-hydroxyphenyl) fluorene of Example 1 while vigorously stirring. The polyester was then synthesized in the same manner as in Example 1.

The polyester thus obtained had an inherent viscosity of 1.0 dl/g and a glass transition temperature of 355° C.

The polyester was then dissolved in 1,1,2,2-tetrachloroethane at a concentration of 3% by weight, which was labelled a sample E.

Comparative Example 2

In 300 ml of 1,2-dichloroethane, 100 mmol of a mixture of fumaric chloride/terephthalic chloride (acid mole ratio =5/95 or 10/90) was dissolved and the resultant solution was added, while vigorously stirring, to the aqueous solution of 9,9-bis(4-hydroxyphenyl) fluorene of Example 1. The synthesis of the polyester was carried out in the same manner as in Example 1.

The properties of the resultant polyesters were as follows:
Inherent viscosity: 1.0 and 1.1 dl/g
Glass transition temperature: 325° C. and 340° C.

The polyester samples were dissolved in 1,1,2,2-tetrachloromethane at a concentration of 3% by weight, as samples E and F.

The following evaluation tests were carried out for the samples A, B, C and D according to the present invention and the Comparative samples E and F.

The results are shown in Table 2.

Storage stability

Each sample was dissolved in 1,1,2,2-tetrachloroethane at a resin concentration of 20% by weight. The resultant solution was allowed to stand at room temperature and the days for which no changes in the properties were observed are shown in Table 2.

Photocurability

Each sample was coated at a film thickness of 1 to 2 μm by a spin coater on a glass plate, followed by drying at 150° C. for 20 minutes. The coated film was photocured by irradiating the film with a high pressure mercury vapor lamp at a power input of 30 w/cm and a lamp output of 1 Kw for one minute, from a position 10 cm away from the film. The cured conditions were visually evaluated.

Adhesion

The cured film after the above-mentioned photocurability test was cross-cut to form 100 portions having a size of 2 mm square, a pressure-sensitive adhesive tape was adhered to the cross-cut film, and then the tape was peeled off and the number of peeled-off and cross-cut portions from the 100 portions counted.

Heat resistance

The cured film after the above-mentioned photocurability test was heat-treated at 250° C. for 120 hours and the conditions of the cured film were visually observed.

Soldering heat resistance

The cured film after the above-mentioned photocurability test was dipped for 10 seconds in a soldering bath at 260° C., and the conditions of the cured film were visually observed.

Water-vapor resistance

The cured film after the above-mentioned photocurability test was allowed to stand for 120 hours under the conditions of 40° C. and 90% RH, and the condition of the cured film was visually observed.

Chemical resistance

The cured film after the above-mentioned photocurability test was dipped in a solvent, i.e., toluene, 1,1,2,2-tetrachloroethane, or trichloroethylene at 25° C. for 1 hour and the condition of the cured film was visually observed.

Surface hardness

The surface hardness of the cured film after the above-mentioned photocurability test was evaluated by using a pencil having a hardness of 6 H.

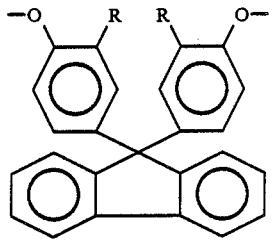

wherein
R represents hydrogen or an alkyl group having 1 or 2 carbon atoms:
Y represents a structure (B): 1—OC—CH=CH—CO—Z represents a structure:
and

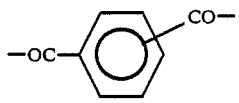

TABLE 2

|  | Example | | | | | Comparative Example 2 | |
| --- | --- | --- | --- | --- | --- | --- | --- |
|  | 4 | 5 | | | 6 | | |
| Sample No. | A more than 60 days | B more than 60 days | C more than 60 days | D more than 60 days | E more than 60 days | F more than 60 days | G more than 60 days |
| Storage Stability | o | o | o | o | o | x | x |
| Photocurability | o | o | o | o | o | o | o |
| Adhesion (Number) | o | o | o | o | o | o | o |
| Heat-resistance | o | o | o | o | o | o | o |
| Soldering heat-resistance | o | o | o | o | o | o | o |
| Water Vapor resistance | o | o | o | o | o | o | o |
| Chemical resistance | o | o | o | o | o | x | x |
| Surface hardness | o | o | o | o | o | o | o |

O: Good
x: Poor

We claim:

1. A heat-resistant unsaturated polyester having a structure represented by the formula (I):

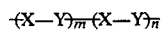 (I)

wherein X represents a structure (A):

m and n independently represent a repeating number;
a mole ratio of Y/Z being 10/90 to 99/1;
said polyester having an inherent viscosity ($\eta_{inh}$) of at least 0.4 dl/g as determined at a temperature of 30° C. in a solution of 0.5g of the polyester in 100 ml of dimethylformamide.

2. A solvent-insoluble polyester obtained by curing a polyester according to claim 1 by a thermal treatment.

3. A heat-resistant photosensitive material obtained by diluting a polyester according to claim 1, said polyester having a mole ratio of Y/Z of 20/80 to 99/1 and an inherent viscosity ($\eta_{inh}$) of at least 0.3 dl/g.

* * * * *